(12) United States Patent
Krise et al.

(10) Patent No.: US 7,645,094 B2
(45) Date of Patent: Jan. 12, 2010

(54) METHODS FOR THE RAPID DEPLOYMENT OF PIPING

(75) Inventors: Martin Krise, Florence, KY (US); Ken Broussard, Ridge City, TX (US); John Wootton, St. Louis, MO (US)

(73) Assignee: DRS Sustainment Systems, Inc., St. Louis, MO (US)

( * ) Notice: Subject to any disclaimer, the term of this patent is extended or adjusted under 35 U.S.C. 154(b) by 203 days.

(21) Appl. No.: 10/889,599

(22) Filed: Jul. 12, 2004

(65) Prior Publication Data

US 2005/0109870 A1 May 26, 2005

Related U.S. Application Data

(60) Provisional application No. 60/486,486, filed on Jul. 11, 2003.

(51) Int. Cl.
*F16L 1/028* (2006.01)
*B66F 11/00* (2006.01)
*B65F 9/00* (2006.01)
*B65G 67/00* (2006.01)
*B65H 16/02* (2006.01)
*B65H 75/40* (2006.01)

(52) U.S. Cl. .................. 405/174; 414/745.4; 242/557

(58) Field of Classification Search ............. 405/184.5, 405/154.1; 137/236.1; 242/557; 414/745.4; 701/214
See application file for complete search history.

(56) References Cited

U.S. PATENT DOCUMENTS

| 3,995,355 | A | * | 12/1976 | Sneed et al. | ........... 29/890.144 |
| 4,148,445 | A | * | 4/1979 | Reynolds et al. | ......... 242/388.7 |
| 4,186,894 | A | | 2/1980 | Brown | |
| 4,898,497 | A | * | 2/1990 | Behr | ........................ 405/154.1 |
| 5,083,722 | A | | 1/1992 | Briggs et al. | |
| 5,532,690 | A | * | 7/1996 | Hertel | ........................ 340/989 |
| 6,419,424 | B1 | * | 7/2002 | Null et al. | .................... 405/174 |
| 6,430,416 | B1 | * | 8/2002 | Loomis | .................... 455/456.1 |
| 6,453,298 | B2 | * | 9/2002 | Murakami et al. | ............. 705/8 |
| 2007/0137728 | A1 | * | 6/2007 | Krise et al. | .................. 141/248 |

FOREIGN PATENT DOCUMENTS

| CH | 683257 A5 | 3/1992 |
| DE | 38 13419 A1 | 11/1989 |

(Continued)

OTHER PUBLICATIONS

Gregory H. Graves & Jeffrey L. Higgins, Applications of Simulation in Logistics Combat Developments, Proceedings of the 2002 Winter Simulation Conference, pp. 911-916, ISBN: 0-7803-7615-3, available at http://www.informs-cs.org/wsc02papers/119.pdf.*

(Continued)

*Primary Examiner*—Gregory W Adams
(74) *Attorney, Agent, or Firm*—Sonnenschein Nath & Rosenthal LLP

(57) ABSTRACT

A piping transport structure for use with a deployment vehicle to provide for improved efficiencies in laying temporary or semi-permanent piping structures. There is also a system for having one or more deployment vehicles smoothly lay piping and to allow for long pipe lays to be carried out in less time.

12 Claims, 9 Drawing Sheets

FOREIGN PATENT DOCUMENTS

| EP | 0 028 574 A1 | 5/1981 |
|---|---|---|
| FR | 2 768 419 A1 | 3/1999 |

OTHER PUBLICATIONS

Southwest Research Institute News, "SwRI® to provide improved battlefield fuel supply system for U.S. Army", Jul. 9, 2003.*

Joint Bulk Petroleum and Water Doctrine, Joint Publication Apr. 2004, May 23, 2003.

Military Petroleum Pipeline Systems, Field Manual, No. 5-482, Headquarters, Department of the Army, Washington, DC, Aug. 26, 1994.

The Inland Petroleum Distribution System (IPDS): Can it Fuel the Force?, LTC Kimberly A. Weaver, Apr. 10, 2001.

U.S. Army, Aviation & Troop Command, "Rapid Deployment Tactical Fuel and Water Distribution System," http://www.willbros.com/_filelib/FileCabinet/Projects/Global/0134.pdf?FileName=0134.pdf, printed on Jun. 14, 2005.

Basic Petroleum Logistics Division, http://www.quartermaster.army.mil/pwd/bpld.html, printed on Sep. 30, 2004.

* cited by examiner

METHODS FOR THE RAPID DEPLOYMENT OF PIPING

CROSS REFERENCE TO RELATED APPLICATION(S)

This application claims priority to U.S. Provisional Application Ser. No. 60/486,486 filed Jul. 11, 2003, the entire disclosure of which is herein incorporated by reference.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract No. DAAE07-00-C-L046 awarded by TACOM - Warren Mich.

BACKGROUND OF THE INVENTION (1) Field of the Invention

The present invention pertains to a truck-mounted pipe deployment system and methods for using a truck-mounted pipe deployment system to rapidly install temporary or semi-permanent piping lays with minimal labor requirements.

(2) Background of the Invention

Modern militaries consume a tremendous amount of fluid in their day-to-day activities. A modern fighting vehicle can burn through tens if not hundreds of gallons of fuel a day. Further, infantry and other human elements as well as vehicles require a large amount of water for drinking, cooking, cooling and other activities. This can add up to over 1 million gallons of fuel and water a day having to be provided at the military front to keep lines advancing.

When the force is in combat, or is simply deployed to a remote location far from supply depots, these fluids may not be readily available. While water sources may be nearby, the water may not be potable or may not be sufficient to meet needs. Further, even if water can be collected and purified from nearby sources, fuel can generally not be refined in the field. The diesel or jet fuel used by many fighting vehicles and used by support operations to run generators, pumps, heaters, filters, and other devices must be refined from crude oil in large refineries which cannot be taken to the battlefield.

Beyond the military, civilian organizations which work in areas which lack infrastructure can have similar problems. Disaster relief agencies have the need to bring in fuel for generators and to operate vehicles such as bulldozers or other earthmovers as well as to bring in potable water. In the areas where these services operate, existing infrastructure has usually been damaged, compromised, or destroyed prohibiting its use and requiring the agency to utilize portable systems.

While the transport of all fluids have similar problems, one fluid of particular note is fuel. Transport of fuel is particularly problematic because, particularly in the military, fuel is consumed in the process of transporting fuel. Therefore, there are large inefficiencies created in the transport of fuel. Generally, in the modern military, the only way to get fuel to those who need it is through the use of transport vehicles (such as, but not limited to, trucks, rail cars, boats, and aircraft). For forces which operate on the front lines (generally ground forces), getting them the fuel they need to remain operational requires a fairly complicated and costly supply chain.

Firstly, fuel is often brought to a supply depot that is arranged behind the front lines. This supply depot may have air or water access to allow transport planes or boats to bring in a large quantity of fuel at one time. This fuel is then transported from this supply depot to the front line. Often times, the depot is relatively immobile as the depot relies on the availability of the airfield or port for shipments of fuel. However, smaller subdepots (or fuel dumps) can be arranged closer to the front lines to allow for transport of fuel behind the lines in preparation of later transport to fighting forces. Such a subdepot arrangement can provide for quicker filling of fighting forces needs.

Currently, to get the fuel from a depot to a subdepot, or from the subdepot to the fighting forces, trucks or other ground transports are used. This generally results in convoys ferrying fuel across whatever terrain the fighting forces may have already covered, to reach the fighting forces and supply them.

The convoy is a highly inefficient way for transporting fuel. A fighting vehicle engaged in a combat operation or remotely deployed will generally be constantly on the move attempting to advance towards the enemy and engage them in combat to take ground. This means that every time a vehicle is refueled, it generally moves further away from its support structure requiring additional support structure.

Since the trucks which transport fuel also need fuel to get their loads from the depot to the fighting vehicles, those transports use up fuel to transport it to the fighting vehicles and to return to the depot empty for another load. Some of those vehicles use tremendous amounts of fuel to be able to traverse difficult terrain and due to their inherent inefficiency. As the fighting vehicles advance further and further, generally more and more fuel is needed for the fuel trucks to make the trip unless a new depot or subdepot can be established and other methods can be used to transport the fuel to these locations. This problem can rapidly lead to a breakdown of transportation and supply. If a fighting force moves too quickly or gets too far away from an established fuel depot, the amount of fuel used by the transport vehicles to get fuel to the fighting vehicles can be prohibitively expensive and/or consume resources that are better utilized elsewhere. It is possible that a supply chain could become broken because so much fuel would be consumed to get fuel to fighting vehicles, that there is none left to actually transport to the fighting vehicles. Further, as the system gets less and less efficient, damage to the fuel convoy or supply chain (such as a lost fuel shipment) can become more and more dangerous to the fighting vehicles which can end up stranded.

In the world of modern warfare, the fuel convoy, even when technically behind the lines, is also vulnerable to attack from enemy forces. As has recently been shown in U.S. military conflicts, fuel convoys are a popular target and the potential from an attack causing both loss of life and supplies and the taking of prisoners is enormous. Part of this reason is that fuel trucks, to maximize their transport capability, are difficult to armor or defend. Armorments are additional weight on the fuel truck which means that it spends more fuel trying to get where it is going, which means that it transfers less. Generally therefore, as trucks transporting fuel strive to be individually safer and resistant to attack, the convoy is forced to include more trucks. The increase in the number of trucks in turn makes the convoy larger and more vulnerable.

To try and deal with the problems presented by transporting fuel in trucks, it is desirable in many situations to install piping and pumps to enable the fuel to be pumped from one location to another. This is particularly efficient where there is a lower risk of a pipeline being attacked such as when it is behind friendly lines or can be easily defended by troops already present. Such a methodology can allow for more fuel to be moved closer to the fighting vehicles at a fraction of the fuel cost of a truck convoy. In a pumping system, the fuel can be transferred from the depot to the subdepot via the pipeline, and then trucks can deliver from the subdepot to more forward locations where their improved mobility and autonomous nature may be needed. Further, as the trucks do not have to travel as far, the trucks can be more heavily armored without a dramatic increase in the size of the convoy. This can provide for tremendous fuel savings in the transport operations. As the fighting vehicles move, more piping and pumps can be added allowing the subdepot to regularly move closer to the fighting vehicles allowing for improved efficiency.

In this methodology, trucks would only be used for the last leg of the transfer and the last leg can be significantly shortened over what the trucks traversed previously. As the pump and piping setup is generally much less expensive and much more fuel efficient than truck transport, this can make overall the fuel transport logistics more efficient and the fighting force more effective and more resilient to potential problems. In particular, more fuel can make it to the fighting vehicles in less time, allowing the military to better accomplish its goals and to take ground at a faster pace when the opportunity presents itself. While this system clearly has its benefits, it creates its own unique problems. In particular, the laying of piping requires its own logistics trail and support. Currently there are no mechanisms for deploying (or recovering) the pipeline and pumps quickly and with a relatively minimal amount of manpower as is necessary to support a military force which is constantly advancing. Current systems for laying a pipeline are generally fairly slow and require significant man hours to both deploy (lay) and recover.

Traditionally, laying a pipeline (or in fact any infrastructure which connects two points), the methods begin at one or both ends, and slowly build the pipeline toward the other end utilizing short rigid sections. Currently, the U.S. Army's system for deploying piping is a containerized package of rigid piping sections which are loaded on the back of a deployment vehicle (such as a HEMTT-LHS truck or other transport truck) to be deployed by engineers in the field. The containerized package is used so that outside of combat or deployment areas, the pipe sections can be transported or stored in shipping containers of the type well known to those of ordinary skill in the art.

To deploy the piping in this type of system, engineers drive the truck to the existing end point of the piping lay and slowly unload the sections, connecting each new section to the existing pipeline lay in sequence. When all the sections in a truck have been used, the truck returns to a supply point and gets a new container of pipeline sections, drives out to the new endpoint of the pipeline, and the process begins again. Alternatively, a collection of trucks may be sent simultaneously with each truck returning when empty. The problem with these systems is that each container can only hold a certain number of sections. Further, because the sections are rigid, and generally of a hollow cylindrical shape, there is a significant amount of wasted space in the container as each piece of piping defines a hollow center which space cannot be taken up by other sections. Therefore, the distance that the piping carried by a single truck can cover is often not that great. Further, each portion of the pipe carried by a single truck is actually comprised of a series of subsections which need to be connected together. Therefore, to lay all the pipe carried in even a single truck still requires significant connecting of pipe pieces. Further, these pipe pieces are generally not readily positionable once two or three have been fastened together (either because of weight, fear of strain, or other reasons).

It is generally not possible to attach the resulting piping into smaller sections and then combine these smaller sections together. Instead, the piping has to be installed in a relatively serial or sequential fashion, which is much slower. Further, because a single truck carries multiple pieces which need to be attached together, personnel are attaching piping even if the distance to be covered is short enough to only require a single truck's load of piping. A crew cannot begin placing (or laying) a later pipe section either from a single truck's load or from a later truck, until the position of all the prior sections is known without risking having subsections fail to connect and having to dismantle part of an assembled pipeline to connect it with the existing pipeline.

A further problem with these systems is the manpower and trucks required. Utilizing sections of rigid pipe means that each section of pipe takes up a volume including its entire internal volume (which is generally hollow) and the space inside the pipe is wasted on transport which means each truck carries less piping than it could. Further, to unload and connect the sections of pipe requires numerous personnel. Some can be unloading and placing the sections in a general layout while others are connecting the next sections to the existing sections before moving on. However, the unloading operation cannot proceed much ahead of the connecting operation or else the repositioning required from slight variations in placement begins to overtake any benefit gained from the advanced placing.

SUMMARY OF THE INVENTION

Because of these and other problems in the art, described herein are systems and methods for allowing the rapid laying of piping from a deployment vehicle. The systems and methods utilize two structures to enhance the speed of laying pipe. Firstly, the systems and methods utilize spooled piping to allow for a longer single section of piping to be included on a deployment vehicle. Secondly, the entire piping operation utilizes smooth laying techniques and/or positioning systems designed to lay directly from the deployment vehicle to allow for improved laying of any individual section and for almost simultaneous laying (what is referred to herein as staggered laying) of multiple sections of piping.

This system can have numerous advantages over the systems of the prior art. In particular, the system can allow a significantly greater amount of piping to be stored in a single container and loaded on a single deployment vehicle than was available with systems which utilize rigid subsections. Further, the system can be designed to unspool the piping automatically or by a human operator working in conjunction with the movement of the vehicle. In this way, the laying operation can be performed by a vehicle supported by a few operators instead of a work team. Still further, a deployment vehicle can include a single continuous section of piping which is dramatically longer than any single piece of rigid piping which can be carried by the same vehicle eliminating many of the connection operations which in turn also decrease the number of persons needed to carry out the installation.

The systems and methods herein can also be designed to allow for a computation (a plot) of an entire pipeline lay including piping from multiple deployment vehicles prior to the laying of any piping. This computation can then allow for the dispatch of multiple deployment vehicles which will work in a staggered lay allowing the laying of an extended length of piping to be dramatically faster. In this way, a large series of pipe sections can be laid down at close to the same time, and be connected once all or almost all sections have been laid, saving a large amount of time and effort.

Described herein, in an embodiment is a piping transport structure comprising: a support structure; a reel attached to the support structure; piping rolled about the reel; an outrigger connected to the support structure; and a piping deployment and retrieval device connected to the support structure; wherein, when the piping is unrolled from the reel, the piping passes through the outrigger and the piping deployment and retrieval device.

In an embodiment of the piping transport structure, the structure is transported on a deployment vehicle such as, but not limited to a HEMETT-LHS which may lay the piping on the ground as it moves, the speed that the piping passes through the piping deployment and retrieval device may determine the speed at which the piping is laid on the ground. This may be controlled by a human operator, or may be related to the speed of the deployment vehicle.

In an embodiment of the piping transport structure, the piping deployment and retrieval device may comprise two spaced cylindrical rollers which may compresses the piping between them.

In an embodiment of the piping transport structure, the piping deployment and retrieval device is moveable relative to the support structure. In another embodiment, the outrigger may comprise a positioning arm and an orifice, or a motor to turn the reel.

In an embodiment, there is described herein, a piping transport structure comprising: support means for providing a frame for the piping transport structure; reel means attached to the support means, the reel means having piping rolled thereon; outrigger means connected to the support means, the outrigger means allowing piping being unrolled from the reel means to be placed at a distance from the support means; and piping deployment means connected to the support structure, the piping deployment means controlling the speed the piping is unrolled from the reel means. In an embodiment, the piping deployment means also controls the speed that the piping is rolled onto the reel means.

In Another embodiment, there is described herein, a method for deploying piping comprising: providing a plurality of deployment vehicles, each deployment vehicle carrying a predetermined length of piping; starting all of the plurality of deployment vehicles at relatively the same departure point; sending each of the plurality of deployment vehicles to a different piping lay start point associated with the deployment vehicle, each deployment vehicle departing the departure point relatively simultaneously; having each deployment vehicle begin laying the piping carried by it when it reaches the piping lay starting point associated with that deployment vehicle regardless of the position of the other of the plurality of deployment vehicles; connecting the piping of a first of the plurality of deployment vehicles to the piping of a second of the plurality of deployment vehicles after the second of the plurality of deployment vehicles has started laying piping and before the second of the deployment vehicles has completed laying piping.

In an embodiment of the method, the laid piping is temporary. In another embodiment, the deployment vehicle may comprises a HEMTT-LHS carrying a piping transport structure. The piping transport structure may include: a support structure; a reel attached to the support structure; piping rolled about the reel; an outrigger connected to the support structure; and a piping deployment and retrieval device connected to the support structure. In operation, when the piping is unrolled from the reel, the piping may pass through the outrigger and the piping deployment and retrieval device.

DETAILED DESCRIPTION OF THE PREFERRED EMBODIMENT(S)

In order to effectively describe systems and methods for the laying of piping, this disclosure will begin by describing an embodiment of a piping transport structure and deployment vehicle and then go into how such a deployment vehicle can perform pipe laying of a single section. This disclosure will then turn to how a team of vehicles carrying similar piping transport structures can efficiently lay pipe by performing what is termed a staggered lay.

Figure 1:
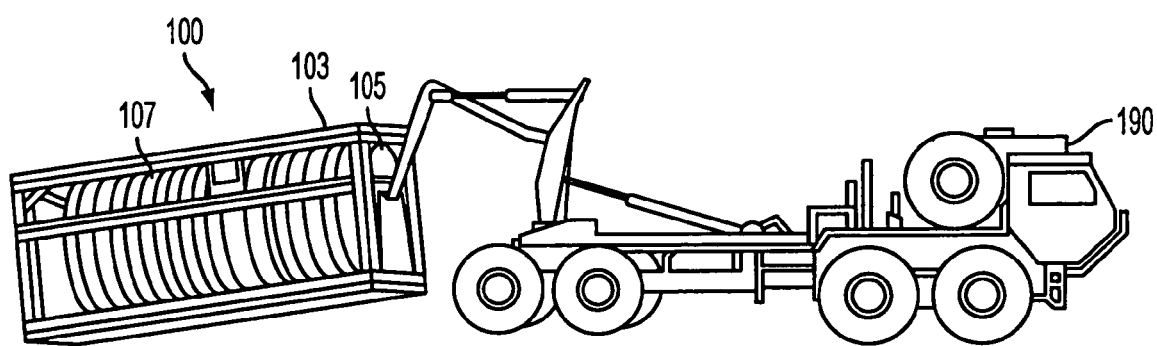
FIG. 1 shows an embodiment of a piping transport structure being loaded on a deployment vehicle.

FIG. 1 shows an embodiment of a piping transport structure (100) being loaded on the back of a deployment vehicle (190) and comprising an embodiment of the invention. The piping transport structure (100) comprises three principle components. A support structure (103) which is generally of metal or other sturdy and strong material designed to support the weight of the other structures and to provide a shape and lift location for loading the piping transport structure (100) on the deployment vehicle (190). In a preferred embodiment, the support structure (103) is sized and shaped so that the support structure (103), and everything placed within it, can be carried in a standard shipping container of the type known to those of ordinary skill in the art. This will generally result in the support structure (103) having a generally parallelepiped shape, but that is by no means required.

The second component of the piping transport structure (100) is the reel (105) which is a large spindle mounted to the support structure (103) in a manner that reel (105) can rotate around an axis relative to the support structure (103). Generally, the reel (105) will be designed to rotate about an axis extending between the two farthest apart sides (longwise) in the support structure (103). The axis will then generally be arranged to extend lengthwise down the transport vehicle and parallel to the forward direction of motion of the vehicle. In this arrangement, almost all of the space internal to the support structure (103) can be filed with piping (107) rolled on the reel (105).

Piping (107) comprises a generally singular strand of flexible piping (107) designed to allow for the transport of fuel or other liquids therethrough. In a preferred embodiment, this piping (107) is about 1 mile long. Generally, the piping (107) will be of a flattenable hollow cylinder shape but alternatively may simply be bendable about its major axis. The flattenable design allows the piping (107) to be compressed along its length from a generally cylindrical shape having a hollow core, to a relatively flat shape generally with the sides compressed against each other and eliminating the hollow core volume. The flattened shape therefore takes up less volume than the same amount of pipe with the core open.

In an operation to deploy piping to begin a fuel transfer, the flexible piping (107) will begin wound about the reel (105). The piping transport structure (100) will be transported to the depot representing the starting point of the piping lay or to a point where deployment vehicle (190) loading is convenient. This can be performed in any manner known to those of skill in the art but the piping transport structure (100) will preferably be sized and shaped to be transported in a standard shipping container as is known to those of ordinary skill in the art.

Once the piping transport structure (100) arrives at the loading point, the piping transport structure (100) is removed from the container. It is then preferably in a more open and accessible arrangement such as that shown in FIG. 1. In alternative embodiments, however, the support structure (103) may include weather resistant panels (such as a roof) or otherwise be more enclosed to help protect the piping (107) or other components from weather damage. As shown in FIG. 1, the piping transport structure (100) may then be loaded on board a deployment vehicle (190).

In an embodiment of the invention, it is presumed that the deployment vehicle (190) is a military vehicle including a Pallet Load/unload System (PLS) or a Load Handling System (LHS). In FIG. 1 the deployment vehicle (190) is a Heavy Expanded Mobility Tactical Truck (HEMTT) with an LHS or a HEMTT-LHS. In another embodiment, however, the deployment vehicle can be any type of ground transport vehicle such as, but not limited to, a truck, a rail car, a boat, or a hovercraft. The support structure (103) is preferably designed and arranged so that the LHS system can be attached to the support structure (103), and the piping transport system (100) can be loaded on board the deployment vehicle (190) in the standard loading fashion of an LHS. In alternative embodiments, the piping transport system (100) could be loaded by any other methods known to those of ordinary skill in the art, including, but not limited to, direct unloading from an aircraft to the truck or by use of a fork truck, crane or other intermediary loading system. Once the piping transport system (100) is on board the deployment vehicle (190), the piping (107) can either be transported by the deployment vehicle (190) or deployed by the deployment vehicle (190). Generally, the deployment vehicle will transport the piping (107) to the point where deployment is commenced, and then commence deployment of the piping (107).

The piping (107) is preferably rolled about the reel (105) in the standard fashion of any lengthy object rolled around a reel or spindle. In particular, an internal end of the piping (107) was previously placed on the reel (105) and held in position. The reel (105) was then rotated in a first direction while some resistance was maintained on the other end (the external end) of the piping (107). As the reel (105) rotated, the piping (107) was slowly wrapped around the reel (105). Further, because the piping (107) is compressible, the piping (105) was generally compressed on the reel by either compressing the piping (107) through some type of appropriate device (an embodiment of such a device is discussed later) as it is approaching the reel (105), and/or by subsequent layers of piping (107) compressing the prior layers between themselves and the reel (105) or lower compressed layers. Therefore, to unroll the piping (107), the reel (105) is rotated in the opposite direction to the direction used to roll the piping (107) up.

Generally, the unrolling is accomplished by placing the external end of the piping (107) relative to the reel (105) under tension in a manner so that the force on the external end is greater than the force to rotate the reel (105). In a preferred embodiment, the external end is lightly pulled with the reel (105) rotating under power at the same time to decrease the force required to rotate it. In this way the piping (107) is removed smoothly from the reel (105), without having to place undue strain on the piping (107).

Because the piping (107) allows for both flexible rolling and compression, a much greater length of piping (107) can be placed in the same space than if the piping (107) was rigid. Further, because the piping (107) is rolled and the piping roll is allowed to take up most, if not all of the volume of the support structure (103), a single longer length of piping (107) can be placed in the same space taken up by many shorter rigid (or even flexible) pieces. In particular, the reel (105) in an embodiment can maximize the amount of piping (107) in any predetermined volume. Therefore, the piping transport structure (100) can have the largest available single piece of piping (107) for the volume available. This eliminates sub-connections for piping segments carried by a single deployment vehicle (190) as the deployment vehicle (190) need only carry a single piece of piping.

Figure 2:
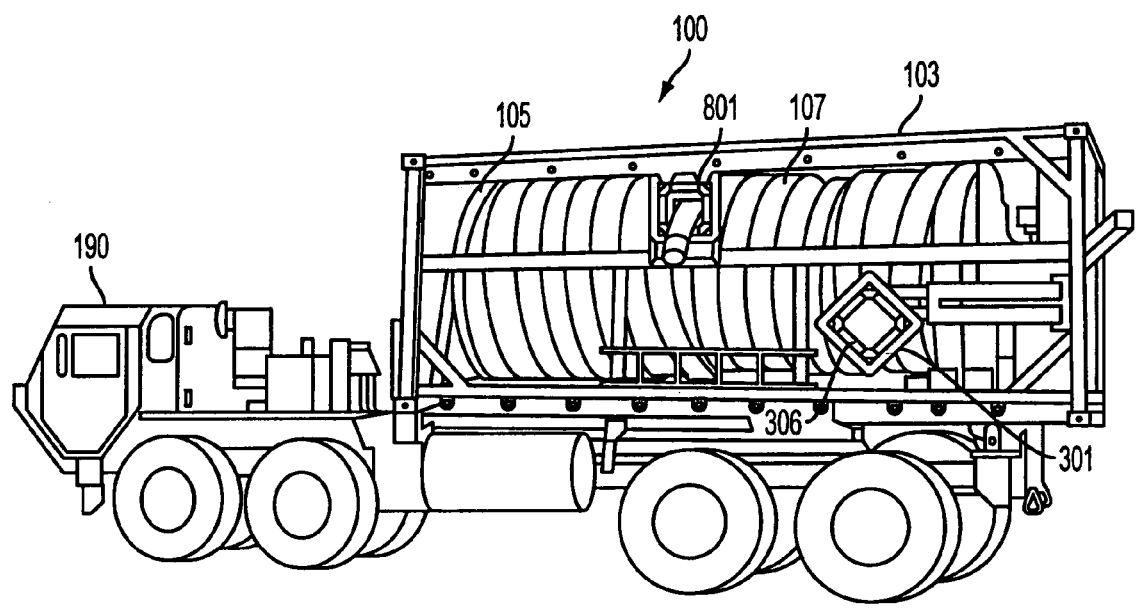
FIG. 2 shows an embodiment of a piping transport structure loaded on a deployment vehicle for transport.

Once the piping transport structure (100) is on the deployment vehicle (190), the deployment vehicle (190) can carry the piping transport structure (100) and any additional devices used in the pipeline (such as pumps) or tools needed to perform the pipe lay to the point where it is to begin piping deployment. A deployment vehicle (190) in the transport arrangement is shown in FIG. 2. In FIG. 2, the piping transport structure (100) is on the deployment vehicle (190) and items designed specifically for deployment of the piping are not in use. In particular the outriggers (301) are in a stored position, the motor (701) is stored, and the external end of the piping (107) is within the support structure (103) and generally secured.

Once the deployment vehicle (190) has reached the intended deployment starting point, the vehicle may be prepared for deployment of the piping (107). This change is often desirable because the deployment operation will usually involve the deployment vehicle moving at a slower rate and along a more careful path as structures to deploy the piping are now used which were not needed (and which could be damaged) during transport. However, in an embodiment, the deploying and transporting could occur from a vehicle in a similar configuration for both activities.

Figure 3:
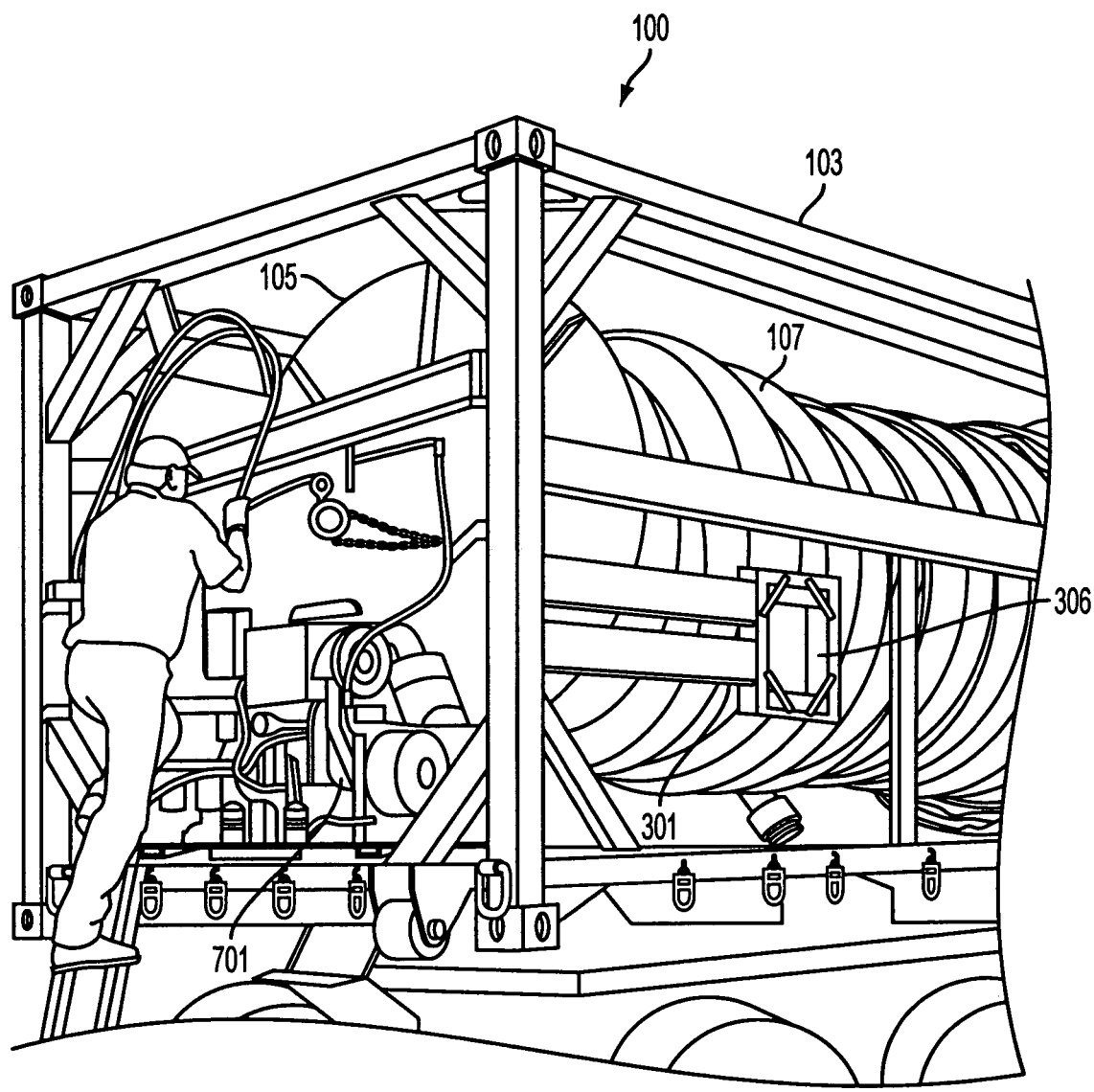
FIGS. 3-4 show an embodiment of a motor being attached to the piping transport structure of FIG. 2.
Figure 4:
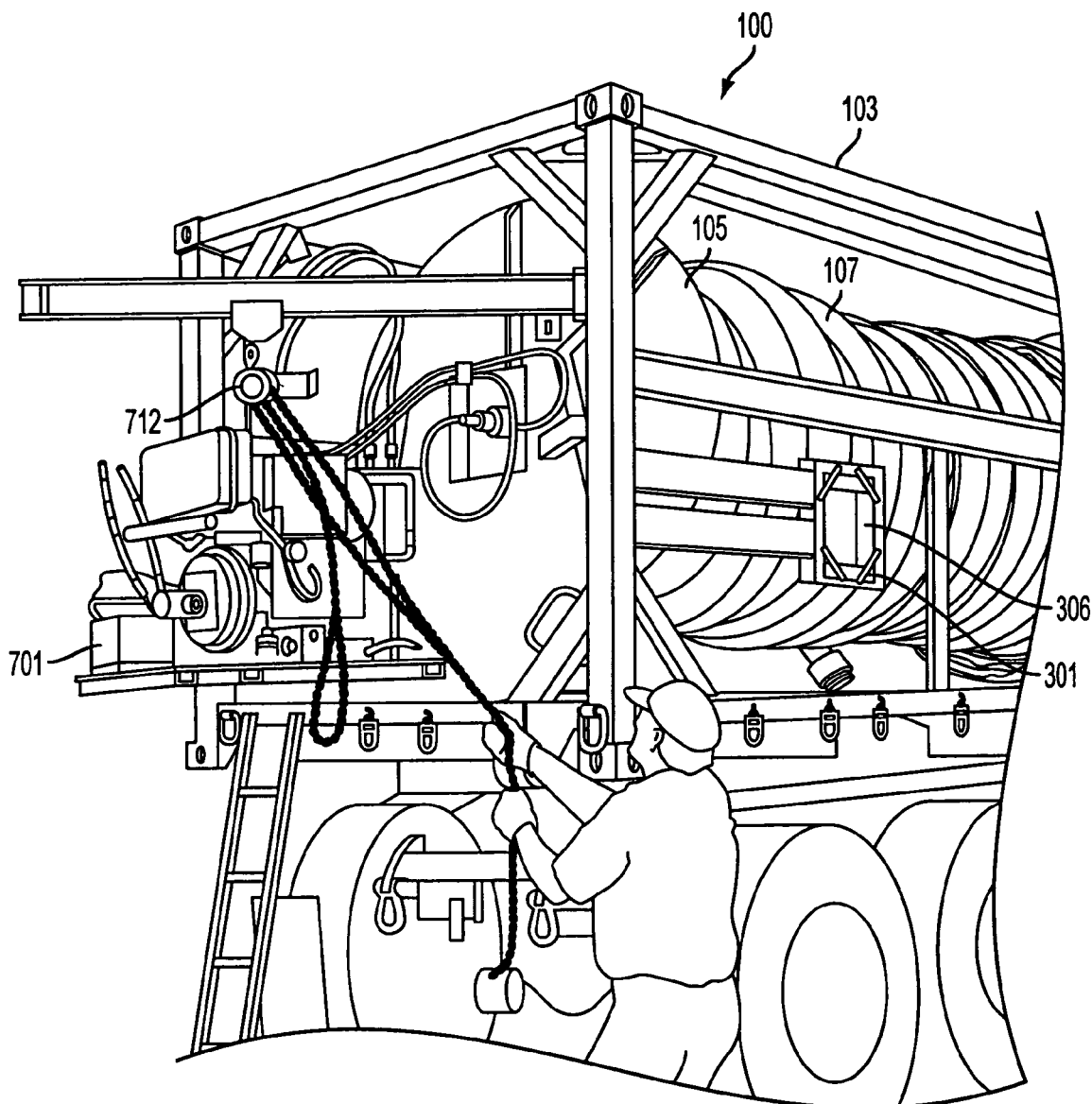
Figure 5:
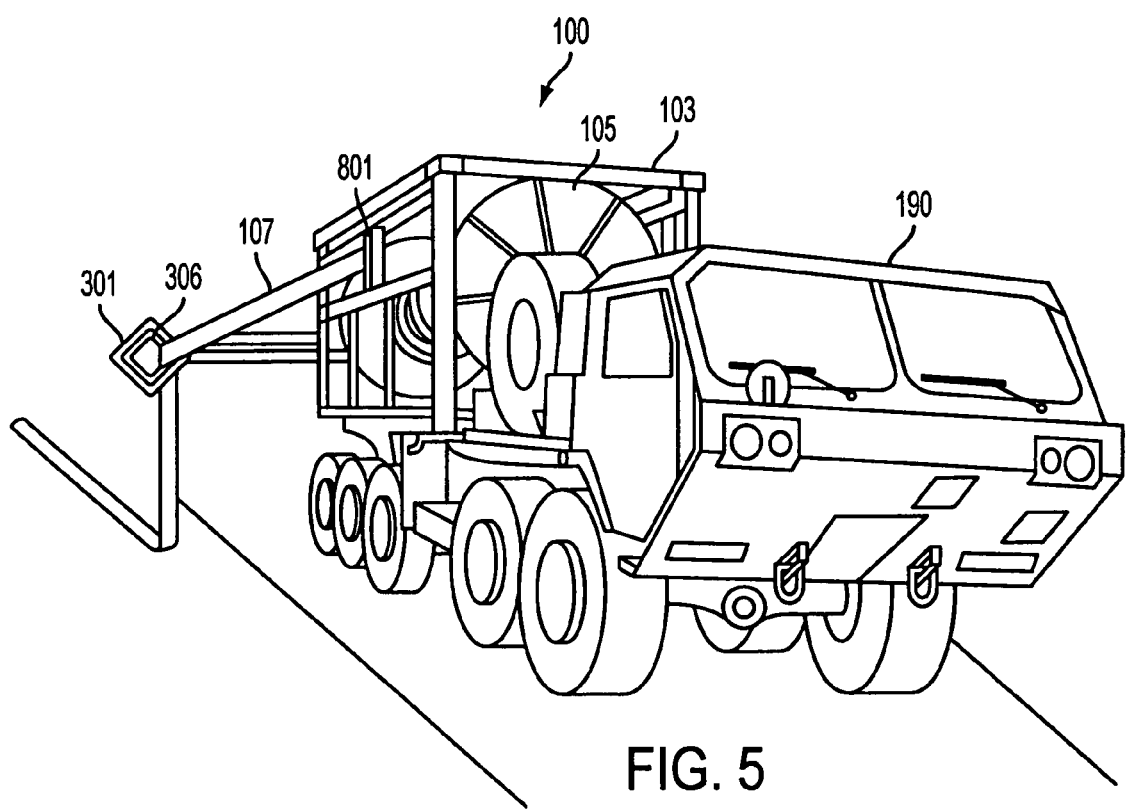
FIG. 5 shows an embodiment of a deployment vehicle deploying piping along the side of a road using an outrigger.

FIG. 5 provides a depiction of an embodiment of the deployment vehicle as it may appear when deploying. FIGS. 3 and 4 provide for depictions for one activity in converting a deployment vehicle from its transport arrangement in FIG. 2, to its deployment arrangement in FIG. 5. These changes may be unnecessary in an embodiment, but are used in the depicted embodiment to provide for improved transport characteristics and for the operation of beneficial structure during deployment.

FIGS. 3 and 4 show personnel setting up a motor (701) to use with the reel (105) in preparation for deployment of piping. Motor (701) provides for powered rotation of the reel (105) which allows for the piping (107) to be unrolled without having to place the piping (107) under as much tension as the motor (701) rotates the reel (105) and decreases the amount of force needed to unroll the piping (107).

The motor (701) is not the only structure which may be altered to convert the vehicle to its deployment arrangement. At least one outrigger (301) will generally be extended (such as shown in FIG. 5) and the external end of the piping (107)

may be directed through a piping deployment and retrieval device (801) (such as that shown in FIG. 8) or other device to steer the piping (107) movement away and aside from the deployment vehicle. The outrigger (301) is generally a positioning arm generally including an orifice (306) through which the piping can pass to provide for the location that the piping (107) is dropped from the deployment vehicle (190). This position will generally be away from the deployment vehicle (190) to prevent the deployment vehicle (190) from driving over the piping, and also to allow the piping to be placed on the side of a road or path. FIG. 5 shows how the outrigger can lay the piping on the side of a road. An embodiment may include any number of outriggers (301) in any position and it is generally preferred that there be at least one outrigger on either side of the reel (105) so that the piping can be placed on either side of the road and to either side of the vehicle.

Once the deployment vehicle (190) is in the deployment arrangement, it may begin deploying piping (107). As was discussed above, in order for the piping (107) to be deployed, it is unrolled from the reel (105), and then placed on the ground in a consistent fashion as the deployment vehicle (190) moves from the starting point to the ending point of the piping lay. To be able to place the piping smoothly, the piping is preferably dispensed at close to the same rate that the deployment vehicle (190) is moving. In this way for every foot the deployment vehicle (190) moves, one foot of piping (107) is deployed. To carry out this equalization, the external end of the piping could be secured to the start point and the deployment vehicle moved, or the reel can be turned at a speed to release an amount of cable proportional or related to the speed of the deployment vehicle (190) and that can be directed to the appropriate point either by the force of gravity, and/or by other mechanisms.

Anchoring the external end to the starting point is used in an embodiment of the invention to provide for release of cable but this does not provide for an accurate piping lay in many cases. In particular, this embodiment can cause the piping (107) to be stretched or even slightly deformed as tension on the piping (107) is created by the pull of the deployment vehicle (190). In effect the reel's mass is resisting the unrolling so the piping (107) may be stretched by the action. This problem can be compounded as it may result in different stretching to different portions of the piping (107), because the reel's (105) resistance to rotation is dependent on how much piping (107) is rolled on it at any instant. Further, securing the external end can be very difficult as the resistance to the reel (105) turning can be very strong and the deployment vehicle (190) can also be very strong resulting in it being easier to move the external end than unroll the piping (107).

This system also makes it much more difficult to lay the piping (107) on a path which is curved. If the deployment vehicle (190) intends to impart a curve to the piping (107) during the lay, the piping (107) tension will generally smooth the curve to a more linear structure. The portion of the piping (107) previously laid in a curve is generally more easily shifted to a linear arrangement than a new portion of piping (107) is unrolled from the reel (105).

Because of these limitations, in the depicted embodiment, the unrolling is instead controlled through the use of a piping deployment and retrieval device (801) and motor (701) to drive both the reel (105) and the piping deployment and retrieval device (801). The motor (701) may be any type of motor and an embodiment is shown in FIGS. 3 and 4. In this embodiment, the motor is stored on the support structure (103) and is not connected to the reel (105) during transport as shown in FIG. 3. FIG. 4 shows an operator using a lift (712) which is also attached to the support structure to maneuver the motor (701) to a position where the motor (701) can rotate the reel (105). The motor (701) therefore will cause the piping (107) to unroll from the reel (105). One of ordinary skill in the art would recognize that if the reel (105) is turning so that the piping (107) is being unrolled at the same speed it is being deployed, even a small force maintaining the external end, of the piping (107), is often sufficient to allow the placement of the piping (107) where directed. This can be the case even around curves or bends. Generally, friction between the piping (107) and the ground and the force of gravity is sufficient to allow for smooth placing.

To get the smooth placing, it is preferable to get the piping (107) to unroll at the same speed as (or at an amount sufficiently close to the speed of) the deployment vehicle (190). If the external end or prior portions of piping (107) is not secured or is only lightly secured to the ground, the deployment vehicle (190) may drag the second end instead of unrolling the piping (107) if the deployment vehicle (190) moves faster than the piping (107) is unrolled. If the deployment vehicle (190) moves too slowly, the piping (107) could "spool" on the reel (105) effectively resulting in it slipping. The reel (105) may also provide too much piping (107) leading to small bunches of piping (107) in deployment. This can result in the piping (107) not traversing the complete distance it was intended to and can result in the internal end not making it to the correct location or to tangling of the piping which can disrupt fluid flow. Either of these results can make connection of this deployment vehicle's (190) piping (107) to another deployment vehicle's (190) piping (107) impossible because there is unexpected space between the start point of one piping lay and the end point of another. After a sufficient amount of piping has been laid, the piping (107) resistance with the ground (because of the large distance unrolled) may be so high that the ends are effectively secured at where they end up when the lay is completed. This means that if there is any problem it cannot later be corrected by reconnecting a deployment vehicle (190) to the external end and pulling the piping (107) back to where it belongs or trying to pull out small bunches. While the motor (701) drive speed can be configured to unroll piping (107) based on the deployment vehicle's (190) speed, as discussed above, it can be difficult to directly correspond the deployment vehicle's (190) speed with the speed that the motor is rotating the reel.

To provide for smooth laying of the piping (107), it is therefore desirable to unwind the piping (107) so that it is laid on the ground at the same or similar speed that the deployment vehicle (190) is moving. In this situation, the resistance of the piping (107) to the ground is not being used to pull the piping (107) from the reel (105), but instead the piping (107) is being pulled by a device (or by hand) in conjunction with the reel (105) rotating prior to its placement, and once freed from the reel (105) is being smoothly laid on the ground at a speed generally similar to that of the deployment vehicle (190). Therefore, the piping (107) already laid is not under strain and cannot be significantly displaced as there is enough piping made available to lay in the space that the deployment vehicle (190) has moved as it moves. In order to lay piping in this fashion, however, it becomes desirable to compensate for variations which will occur in deployment vehicle (190) speed and the speed that the piping (107) leaves the reel (105).

In practice, this smooth laying can be difficult to implement because the reel (103) and deployment vehicle (190) both can have varying speeds unrelated to each other. Further, the reel (105) can release a different linear amount of piping (107) in any one rotation than in any other rotation. The speed that the piping (107) comes off the reel (105) depends on how much piping (107) is still on the reel (105) and how the next rotation of piping (107) is wrapped. In particular, because later wraps of piping (107) overlay the previous wraps, piping (107) near the external end which is unreeled first will effectively unreel faster (greater length unreeled per rotation) than wraps closer to the internal end. This problem is compounded by the fact that the winds of piping (107) need not be uniform and two consecutive turns of the reel (105) could result in very different amounts of piping (107) being unrolled even if the reel (105) is carefully wound.

Because of these issues, it is very difficult to get the reel (105) to unwind the piping (107) at a steady rate by motor (701) being connected to the reel (105) and operating at a steady speed or even operating at a speed directly related to the speed of the deployment vehicle. There will, almost by necessity, be points of faster and points of slower winding. This problem is further compounded by the fact that the deployment vehicle (190) will generally not move at a completely uniform speed. In many situations the speed will be controlled by a human operator and terrain changes or even driver error can result in a non-constant speed. Even if the speed is controlled by a machine, the speed will still generally have slight fluctuations as changes in terrain are compensated for.

Figure 6:
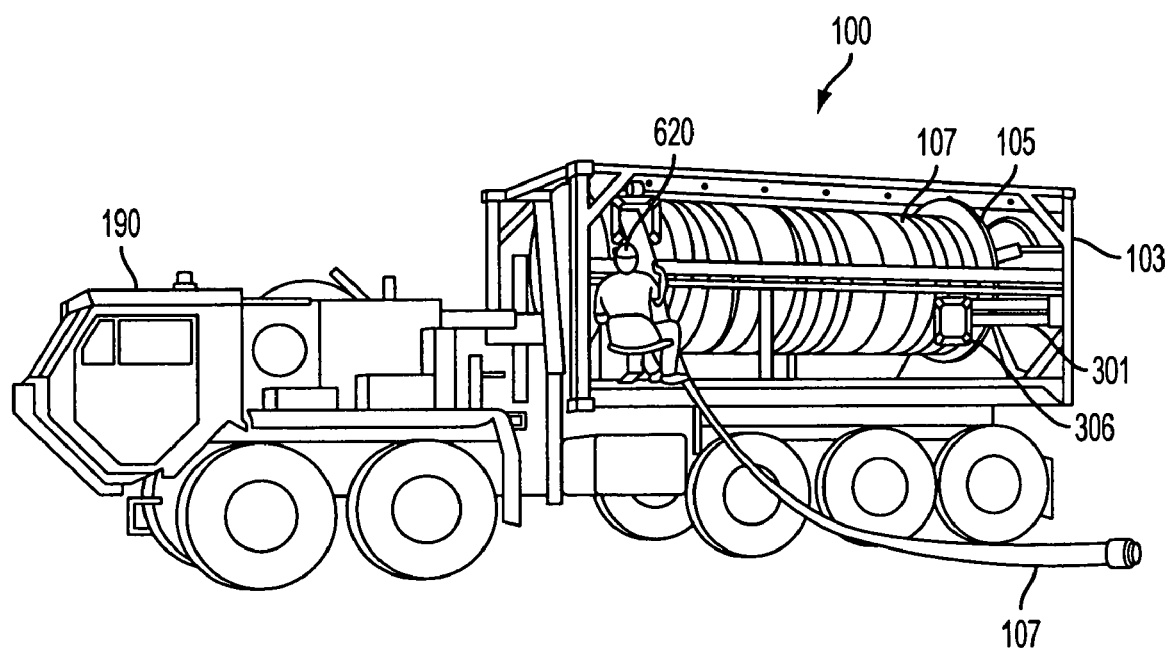
FIGS. 6-7 show an embodiment of a deployment vehicle utilizing a human controlled deployment system.
Figure 7:
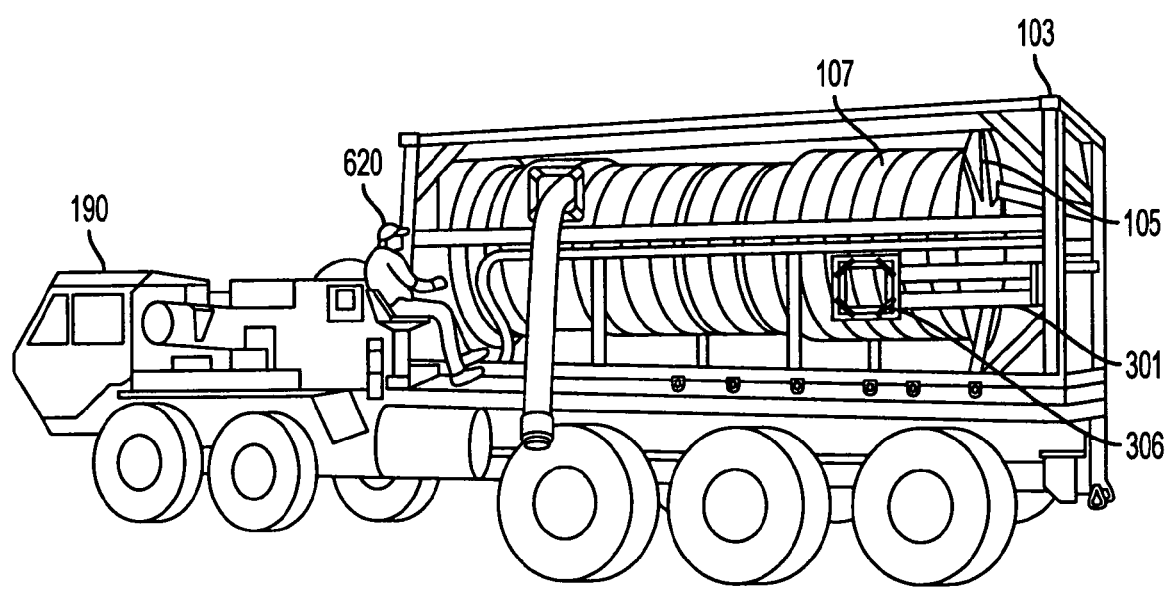

In an embodiment of the invention, the reel (105) rotation speed may be controlled by a human operator who can adjust the speed based on his observation of the lay. In particular, if he sees the tension increasing, he can increase the reel (105) rotation speed. One such embodiment is shown in FIGS. 6-7 where a human operator (620) can observe the pipe lay and alter the speed of the motor (701) as appropriate. In another embodiment of the invention, the deploying operation uses a piping deployment and retrieval device (801) as shown in FIG. 8 to control the unreeling speed.

Figure 8:
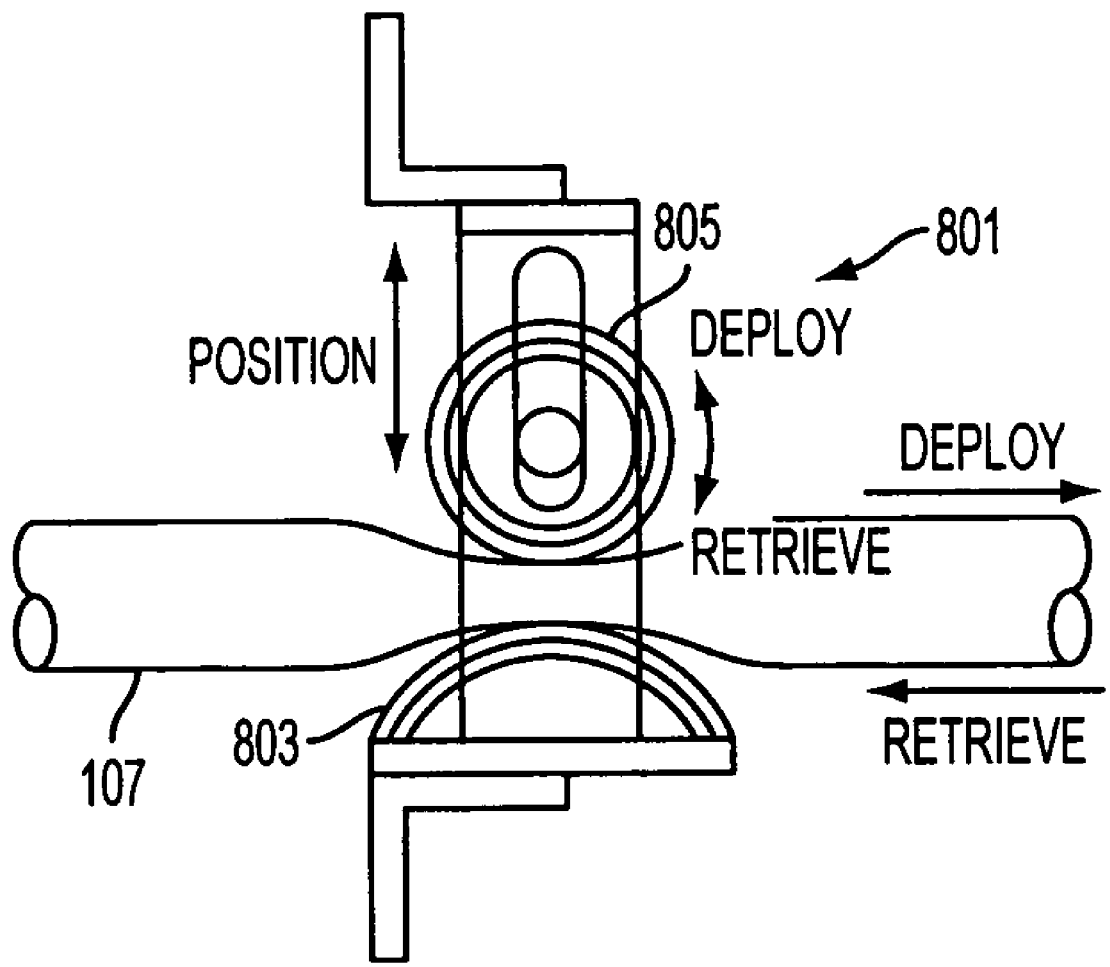
FIG. 8 shows an embodiment of a piping deployment and retrieval device for speed compensation and compressing piping as it is retrieved or deployed.

An embodiment of a piping deployment and retrieval device (801) is shown in FIG. 8. This device is principally designed to perform two functions. When laying or retrieving the piping (107), the device serves as a speed regulator between the speed of the deployment vehicle (190) and the rotation of the reel (105) so that the reel (105) can be rotated at the appropriate speed to collect or deploy the piping (107) based on the speed of the deployment vehicle (190) and the instant speed that the piping (107) is coming off the reel (105). In the second instance, the piping deployment and retrieval device (801) can act as an evacuator to flatten the piping (107) in preparation for being placed on the reel (105) and to make sure no fuel or other liquid (or gas) is in the piping (107) when the piping (107) is rerolled. This can provide for improved and safer storage of the piping when not in use. The piping deployment and retrieval device (801) will generally be mounted on the support structure (103) and may either be permanently placed or removable. It is preferred that the piping deployment and retrieval device (801) be moveable relative to the support structure (103) to provide for alternative placement, but it need not be removable from the structure.

The piping deployment and retrieval device (801) is constructed as follows in the depicted embodiment of FIG. 8. The piping deployment and retrieval device (801) comprises two flattening cylinders (803) and (805) separated by a first distance. This distance will generally be selected so as to relate to the size of the piping (107) being used. In particular, the cylinders (803) and (805) are preferably spaced so that the piping (107) passing between them is generally flattened, evacuating virtually all material from inside their internal volume, but at a sufficient distance that the piping (107) passing between them is not permanently deformed, crushed, or otherwise damaged by the passage therethrough.

This compression of the piping (107) as it passes through can serve to drive any liquid within the piping (107) out by effectively eliminating the empty space within the core of the piping (107) at the instant the piping (107) goes through the cylinders (803) and (805). The liquid is therefore forced through the piping (107) toward the exterior end (through which it can escape) as the piping (107) is retrieved. Further, once a portion of the piping (107) has passed through this compression, no new liquid can get into the piping (107) (so long as the internal end is closed) and therefore the piping (107) remains empty and as it has already been compressed, ready to roll onto the reel (105). The cylinders (803) and (805) may be moveable relative to each other so as to allow for an increase in the distance between them to allow an end (which may not be compressable) to be placed therethrough, if necessary, or to allow the piping deployment and retrieval device (801) to be adjusted to accommodate different sizes of piping (107). The piping deployment and retrieval device (801) may also be moveable relative to the support structure (103) to allow for adjustment for the instant piping coming off (or going on) the reel (105).

In addition to the compression serving to evacuate the piping (107), it also serves another purpose. The compression action imparts a particular speed of movement to the piping (107). In particular, the friction between the cylinders (803) and (805) and the piping (107) generally requires that the cylinders (803) and (805) be driven to allow them to move the piping (107) between. As opposed to the reel (105), because the cylinders (803) and (805) only handle a small segment of the piping's (107) length at any given instant, the piping (107) will move through the device at a speed directly proportional to the rotational speed of the two cylinders (803) and (805).

This type of motion allows for the rotation speed of the cylinders (803) and (805) to effect the deployment (or retrieval) speed of the piping (107) directly. In particular, the speed that the piping (107) exits the piping deployment and retrieval device (801) is the same speed that the piping (107) can be deployed. Therefore, so long as the speed of the piping (107) exiting the cylinders (803) and (805) can be linked to the speed of the deployment vehicle (190), the piping (107) can be laid smoothly. Further, the speed of the piping deployment and retrieval device (801) can be changed to compensate for changes in the speed of the deployment vehicle (190). In this way the piping deployment and retrieval device (801) can operate to allow for variations in the speed to be dealt with quickly and easily.

The piping deployment and retrieval device (801) of FIG. 8 allows for a buffer to be placed which allows for the piping (107) to deploy at the same speed as the deployment vehicle (190) so long as the piping deployment and retrieval device (801) can adjust its speed of deployment based on the speed of the deployment vehicle (190), or vice versa. The deployment speed of the piping deployment and retrieval device (801) may be directly related to the speed of the deployment vehicle (190) by either having a human operator adjust the speed of the mechanism to send piping (107) through faster or slower depending on the speed of the deployment vehicle (190), or may be performed by an electronic feedback loop which automatically detects changes in the deployment vehicle's (190) speed and compensates automatically.

The piping deployment and retrieval device (801) may also be linked to the reel (105) and motor (701) so that it can compensate for changes in the placement of the piping (107) on the reel (105) by feeding back to the motor (701). In particular, if the piping (107) is maintained at a particular tension threshold between the piping deployment and retrieval device (801) and the reel (105), changes in this tension will indicate a correction to the rotation speed of reel (105) is needed. By having feedback to the motor (701), the detected tension change can be used to alter the rotational speed of the motor (701) and therefore the reel (105). During deployment, if the piping deployment and retrieval device (801) detects too much resistance from the reel (105) (tension increase), it can instruct the reel (105) to turn faster to compensate (as the piping (107) is not coming off the reel (105) as fast as it needs to be deployed), if there is too little resistance (tension decrease), the reel (105) can be slowed to eliminate slack (as the piping (107) is coming off the reel (105) faster than the piping deployment and retrieval device (801) is laying it), The piping deployment and retrieval device (801) therefore acts as a speed compensator smoothing out variations in both the deployment vehicle's (190) speed and the reel's (105) speed. Further, a slight time lag between the reel (105) and the piping deployment and retrieval device (801) can be buffered in the tension for the most part, so generally a needed correction in the reel (105) speed is accomplished before the change effects the deployment speed. This buffering can also provide for a safety measure. If the tension gets too great (or too slack) where a potential danger such as damage to the piping (107) might be introduced, the piping deployment and retrieval device (801) can issue an indicator to the driver of the deployment vehicle (190) to stop the deployment vehicle (190) or the piping deployment and retrieval device (801) can shut off the deployment vehicle (190) or cease its movement to prevent damage.

The piping deployment and retrieval device (801) can also act in conjunction with the outrigger (301) which may also be moveable. The outrigger (301) is effectively directing the unrolled piping (107) to its desired location for lay. The piping deployment and retrieval device (801) can be included as part of the outrigger (301), or can be arranged prior in the process (either closer to the reel or further away than the outrigger (301)). If the piping and deployment device (801) is on the outrigger (301) or closer to the reel (105) than the outrigger (301) (between the reel (105) and the outrigger (301)), the outrigger (301) can have some movement flexibility so that if the piping deployment and retrieval device (801) slows the amount of piping (107) being deployed, the outrigger (301) can move to compensate for placement if the deployment vehicle's (190) speed has not yet changed accordingly. The three mechanism control (the deployment vehicle's (190) speed, the deployment speed of the piping (107), and the reel (105) rotation speed or piping (107) tension) can be used together to smooth out inconsistencies so that the piping (107) is smoothly laid.

While the above discussion has focused on the laying of piping (107), the same systems and methods can also be used to roll the piping (107) back up on the reel (105). The above-described systems will generally be used to install piping in a temporary or semi-permanent fashion, so when they are no longer needed, they can be removed. When the pipeline is no longer needed, it is preferably dismantled and readied for another, later, use. This packing-up of the pipeline is generally performed by rolling the piping (107) back on the reel (105) and then returning the piping transport structure (100) to the depot for the next use. Alternatively, the piping (107) may be needed elsewhere so the deployment vehicle (190) could roll it up and then transport it to the needed location and to deploy it again.

It is desirable when rolling (retrieving) the piping (107) to have the operation smoothly lift the piping (107) and roll it at the same speed the deployment vehicle (190) moves. In this way, the deployment vehicle (190) is not dragging slack piping (107), and is not trying to pull up piping (107) which is still laying on the ground ahead of the deployment vehicle (190) which could potentially pull a curve of piping (107) into the deployment vehicle's (190) path of motion. Like the problems with laying the piping (107), these situations can again lead to the piping (107) being stretched or deformed as well as additional problems with the piping (107).

To roll the piping (107) back on the reel (105), the piping deployment and retrieval device (801) can operate in reverse sending the piping (107) to the reel (105) instead of taking the piping (107) from it. The reel (105) can also rotate in the opposite direction. As the deployment vehicle (190) changes speed, the piping deployment and retrieval device (801) can speed up or slow down so as to pick up the piping (107) as the deployment vehicle (190) drives past it. Again, the piping deployment and retrieval device (801) can change the reel's (105) speed if it detects either increased tension (indicating the reel (105) is turning too fast in a rolling operation) or slack (indicating the reel (105) is turning too slow). The piping deployment and retrieval device (801) also can serve to evacuate the piping (107) as it is being provided onto the reel (105) as discussed previously. In this way, if there is any fluid or gas remaining in the piping (107) as it is being rolled, that fluid or gas is removed. This can be particularly important if the piping (107) was used to carry fuel or other explosive or flammable substances as, if these substances remained in the piping (107) when in storage, they could ignite causing a dangerous situation.

The ability to lay and retrieve piping (107) smoothly provides for additional functionality of the deployment vehicle (190) in creating the pipeline. If the piping (107) is laid smoothly, the piping (107) will be laid in a generally steady and predetermined line without bunching or pulling. The starting point of the piping (107) will also generally not change significantly from the initial placement (as it is not pulled out of position) and the distance of the path over which the piping (107) is laid will usually comport closely with the length of the piping (107). With these two variables being close to fixed, it allows for them to be used to improve the efficiency of a larger pipe laying process.

So far in this discussion, the pipe lay has been limited to that placed by a single deployment vehicle (190). However, in many situations the pipeline to be created will generally be longer than the piping (107) carried by any single deployment vehicle (190). These types of pipe laying projects have their own issues which are different from that of deployment from a single deployment vehicle (190), but at the same time involve many similar issues. If the pipe laying occurs smoothly, multiple sections can be placed and allow connection even if they cannot be moved after they are placed and even if the earlier sections are not laid first. These systems and methods allow for multiple deployment vehicles (190) to lay piping (107) at a similar time on the same pipeline without having to wait for a prior deployment vehicle (190) to finish their deployment before beginning the later deployment.

In the prior art, a second deployment vehicle (190) could not begin laying piping (107) until the first deployment vehicle (190) had finished, otherwise, as the piping (107) could not be easily moved once laid, the second deployment vehicle (190) risked placing its piping (107) in the incorrect location and the two piping (107) sections would not be able to be connected. This in turn resulted in either the need for corrective action or removal and replacement of at least some of the piping (107). This type of laying is described herein as serial or sequential.

Figure 9:
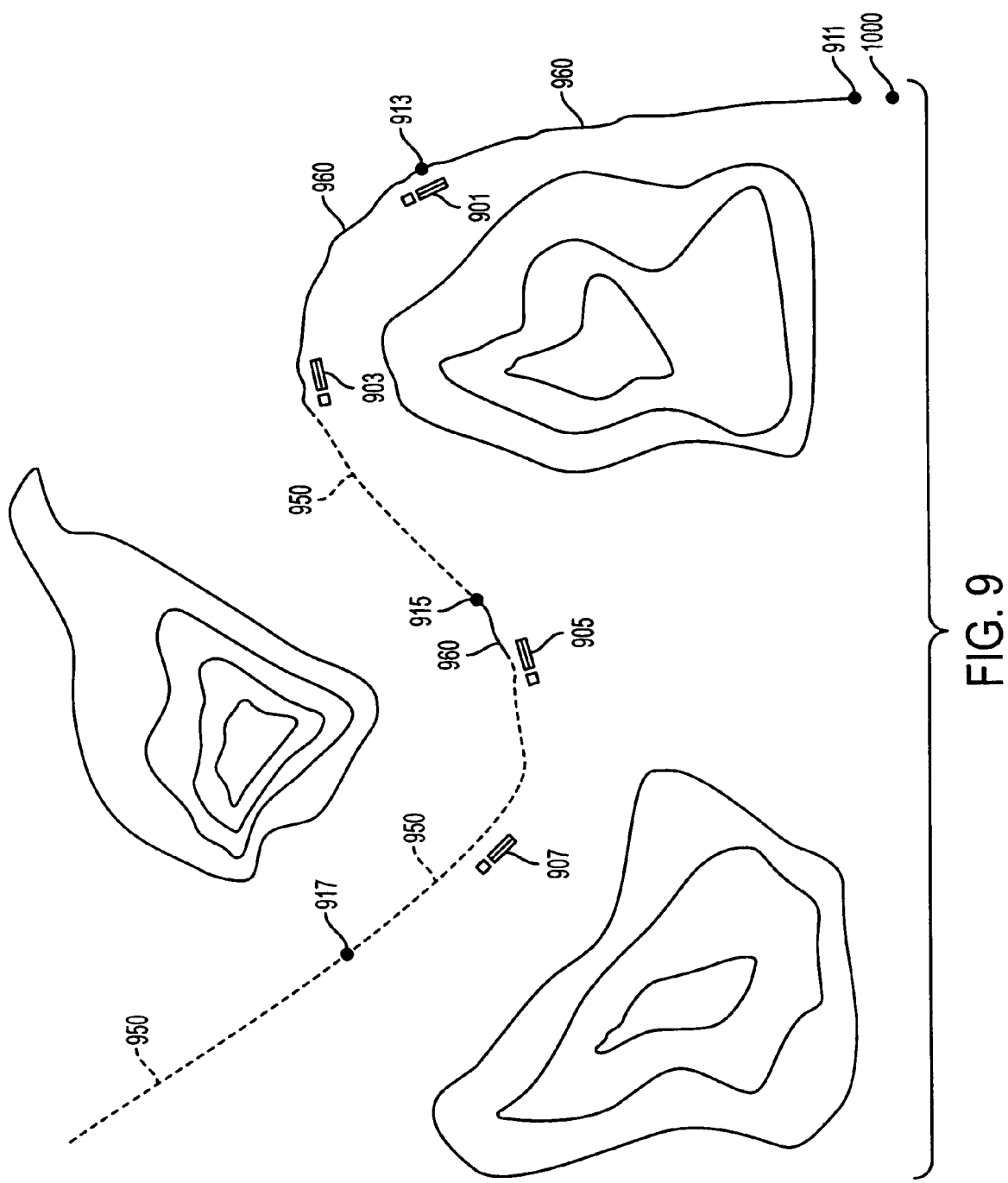
FIG. 9 shows an instant view of a staggered pipe lay of an embodiment of the invention in progress.

In an embodiment of longer pipe laying methods as disclosed herein, multiple sections of piping can be laid relatively simultaneously or in what is termed a "staggered lay." The term "relatively simultaneously" is used because the piping could be laid simultaneously if all deployment vehicles on the pipeline started at their designated piping lay starting points (which are physically separated) at the same time and moved at the same speed but this would not be the preferred method. Instead, the system preferably allows all deployment vehicles to start at the same physical point and lay their sections in a staggered pattern as opposed to the serial or sequential lay of the prior art. FIG. 9 shows an instant image of a staggered lay which is in process.

In the sequential lay of the prior art, the time to lay a particular fixed distance of pipe, where each deployment vehicle (190) can lay a subset of that pipe in a fixed time, is the fixed time for one deployment vehicle (190) to lay its entire contents of pipe multiplied by the number of deployment vehicles (190) plus the number of deployment vehicles (190) multiplied by the amount of time it takes to connect one deployment vehicle's (190) piping section to another deployment vehicle's (190) piping section (any connection within a single deployment vehicle's (190) load is included as part of the time for a single deployment vehicle (190) to lay). Technically, this equation can also include a certain amount of time to get each deployment vehicle (190) to the starting point, however it is presumed that a deployment vehicle (190) can get to the starting point of its lay prior to the completion of at least one prior deployment vehicle's (190) lay so no additional time is added.

In the staggered lay of the instant invention, the time it takes to lay the pipe is simply the time it takes for the farthest deployment vehicle to reach its starting point and lay its pipe. This operation presumes that the distances of pipe laid by each deployment vehicle (190) are such that the connection time is relatively short compared to the deployment time and the travel time and the travel time is relatively short compared to the deployment time. This time expenditure is shorter than that for a sequential lay and the benefit is increased the greater the total lay distance.

The staggered lay is best explained in conjunction with FIG. 9. In particular, all deployment vehicles (901), (903), (905), and (907) leave the departure point (1000) at the same time. As each reaches their pipe lay starting point (911), (913), (915) and (917) respectively, they slow down and begin to lay their piping while the remaining deployment vehicles continue to transport to their pipe lay starting points. Therefore by the time the farthest deployment vehicle (907) has reached its starting point (917), the earliest deployment vehicle (901) has already laid as much piping as it can during that last deployment vehicle's travel time. The last deployment vehicle (907) then begins laying its piping. In the exemplary lay of FIG. 9, deployment vehicle (901) has already completed its lay, deployment vehicle (903) is about halfway completed, deployment vehicle (905) has just started and deployment vehicle (907) is still transporting. Clearly every prior deployment vehicle (901), (903), (905), and (907) has completed laying its pipe (presuming the deployment operation takes every deployment vehicle approximately the same amount of time) by the time the last deployment vehicle (907) has completed its deployment in this exemplary depiction.

Presuming the connection operation is fairly quick, it is also clear that by the time each deployment vehicle (901), (903), (905), and (907) finishes its laying, the next deployment vehicle in line has begun theirs, so at the end of the first deployment vehicle's (903) lay, the start of the second deployment vehicle's (901) lay is present (even though its lay is not completed). Therefore, the piping can be connected as the next deployment vehicle is completing its lay. This continues down to the last deployment vehicle (907). By the time the last deployment vehicle (907) has completed its lay, many, if not all the prior sections would have been laid and connected. Therefore, the total time is approximately the time it takes for the last deployment vehicle (907) to complete its deployment plus the time it took for the last deployment vehicle (907) to transport to its starting point (917). This is significantly less than the time of the sequential lay operation, particularly for operations involving great distance and a large number of deployment vehicles.

Because the piping lay starting point of all the sections is known and will not significantly change as the problem of drag is generally eliminated, the deployment vehicles can transport to a fixed start point and know that their pipe lay will start at a point very close to that and that the end of the prior lay will reach a point very close to the next start point so long as the points have been previously mapped out. Further, once the start point is known, a path to the endpoint to be taken by the deployment vehicle can be determined. This plot of start points and paths can be based on a variety of factors based on the materials available to the person plotting out the lay. For instance the lay can minimize the number of pumps needed by minimizing elevational change. Alternatively, the lay can minimize the distance the piping travels so as to use less piping. In FIG. 9, the plot of lay is the dashed line (950), while the actual lay that has been completed is the solid lines (960). Once this has been plotted out, the deployment vehicle can be sent to its starting position and be provided with a predetermined path to follow. The deployment vehicle can reach the predetermined start point and follow the predetermined path using a positioning system, (such as a global positioning system (GPS) or inertial guidance system). The use of such a system allows for a highly accurate traversal of the path determined by the plot so as to make sure that the piping is laid according to the plot. In this way the start and end points, and the path, are both relatively fixed allowing the staggered lay to be more efficiently accomplished.

As each deployment vehicle involved in the staggered lay can lay its piping based on the plot as discussed above, the deployment of all sections can be determined at once. Therefore, at the beginning of a piping deployment, all deployment vehicles to be used can leave relatively simultaneously and proceed (again using the positioning system) to their predetermined start points instead of the sequential lay where to deal with potential changes to start points and paths, the next deployment vehicle can only be started deploying once the first is completed deploying.

In order to compensate for some unexpected eventualities in the placement of the piping using the deployment vehicle (190) and the piping transport structure (100) of the above embodiments in a staggered lay, for instance because of unknown terrain features which must be bypassed, the piping transport structure (100) and or deployment vehicle (190) can include some smaller piping modules used to fill holes, or some overlap can be built into the plot before the deployment vehicles depart. For instance, each deployment vehicle could carry, in addition to the piping (107) on a reel (105), a few predetermined lengths of piping. In the event that a deployment vehicle runs out of piping (107) before it reaches its target destination, for instance because of deviation from ideal placement, the extensions can be used to connect the two spaced ends. If there is extra piping the two ends are still easily connected with the extra simply being coiled or switchbacked to make the connection at the appropriate point.

Further, because the piping is flexible, while it may not always be possible to drag the entire length of a pipe lay to the next section, it may be possible to drag the end in a direction not in the direction of pipe lay. In particular, the pipe end can be bent toward a connection point to enable connection in an embodiment of the invention.

While the invention has been disclosed in connection with certain preferred embodiments, this should not be taken as a limitation to all of the provided details. Modifications and variations of the described embodiments may be made without departing from the spirit and scope of the invention, and other embodiments should be understood to be encompassed in the present disclosure as would be understood by those of ordinary skill in the art.

The invention claimed is:

1. A method for deploying piping comprising:
   providing a plurality of deployment vehicles, each deployment vehicle carrying a predetermined length of piping;
   starting all of said plurality of deployment vehicles at relatively the same departure point;
   sending each of said plurality of deployment vehicles from said departure point to a different piping lay start point associated with said deployment vehicle, each deployment vehicle departing said departure point relatively simultaneously;
   having each vehicle from said plurality of deployment vehicles begin laying said piping carried by the deployment vehicle when the deployment vehicle reaches said deployment vehicle's assigned piping lay start point without stopping at the start point regardless of the position or progress of the other deployment vehicles of said plurality of deployment vehicles;
   continuing to lay said piping along a predefined path until said each of the plurality of deployment vehicles reaches a start point of another of the plurality of deployment vehicles, said each of the plurality of deployment vehicles having laid an amount of piping prior to reaching said start point of another of the plurality of deployment vehicles; and
   connecting said piping of said each of the plurality of deployment vehicles to the piping of said another of each of said plurality of deployment vehicles independent of the laying progress of another of the plurality of deployment vehicles.

2. The method of claim 1 wherein said laid piping is temporary.

3. The method of claim 1 wherein said deployment vehicle comprises a HEMTTLHS carrying a piping transport structure.

4. The method of claim 3 wherein said piping transport structure includes:
   a support structure;
   a reel attached to said support structure;
   piping rolled about said reel;
   an outrigger connected to said support structure; and
   a piping deployment and retrieval device connected to said support structure.

5. The method of claim 4 wherein, when said piping is unrolled from said reel, said piping passes through said outrigger and said piping deployment and retrieval device.

6. The method of claim 1 wherein said piping lay start point and said path associated with each of said deployment vehicles are determined by a global positioning system (GPS).

7. A method for deploying piping comprising:
   providing a plurality of deployment vehicles, each deployment vehicle carrying a predetermined length of piping and a positioning system;
   assigning a first vehicle selected from said plurality of deployment vehicles a first piping lay start point associated with said first deployment vehicle;
   deriving a first end point for said first vehicle based on said start point, said predetermined length of piping carried by said first vehicle, and the geography over which the piping is to be placed, said first end point being selected so that said predetermined length of piping will extend from said start point to said end point along an optimal path;
   repeating said assigning and deriving for each of said plurality of deployment vehicles where the end point of said first vehicle is the start point for a second vehicle selected from said plurality of deployment vehicles and so on until each vehicle of said plurality of deployment vehicles has a start point and an end point;
   using said positioning system to determine said start point, said end point, and said optimal path of each of said deployment vehicles;
   starting all of said plurality of deployment vehicles at relatively the same departure point at relatively the same time;
   sending each of said plurality of deployment vehicles in a relatively simultaneous fashion from said departure point to said start point;
   having each vehicle from said plurality of deployment vehicles begin laying said piping carried by the deployment vehicle when the deployment vehicle reaches said deployment vehicle's assigned piping lay start point without stopping at the start point regardless of the position or progress of the other deployment vehicles of said plurality of deployment vehicles; and
   continuing to lay said piping along a predefined path until said each of the plurality of deployment vehicles reaches a start point of another of the plurality of deployment vehicles, said each of the plurality of deployment vehicles having laid an amount of piping prior reaching said start point of another of the plurality of deployment vehicles;
   connecting said piping of said each of the plurality of deployment vehicles to the piping of said another of each of said plurality of deployment vehicles independent of the laying progress of another of the plurality of deployment vehicles.

8. The method of claim 7 wherein said positioning system is a global positioning system (GPS).

9. The method of claim 7 wherein said laid piping is temporary.

10. The method of claim 7 wherein said deployment vehicle comprises a HEMTT-LHS carrying a piping transport structure.

11. The method of claim 10 wherein said piping transport structure includes:
    a support structure;
    a reel attached to said support structure;
    piping rolled about said reel;
    an outrigger connected to said support structure; and
    a piping deployment and retrieval device connected to said support structure.

12. The method of claim 11 wherein, when said piping is unrolled from said reel, said piping passes through said outrigger and said piping deployment and retrieval device.

* * * * *